＊US006912399B2＊

US006912399B2

(12) United States Patent
Zirul et al.

(10) Patent No.: US 6,912,399 B2
(45) Date of Patent: Jun. 28, 2005

(54) CELLULAR TELEPHONE WITH PROGRAMMABLE AUTHORIZED TELEPHONE NUMBER

(75) Inventors: Jocelyn Zirul, Brooklyn Center, MN (US); Raymond J. Menard, Hastings, MN (US)

(73) Assignee: Royal Thoughts, LLC, Minneapolis, MN (US)

( * ) Notice: Subject to any disclaimer, the term of this patent is extended or adjusted under 35 U.S.C. 154(b) by 598 days.

(21) Appl. No.: 09/767,663

(22) Filed: Jan. 22, 2001

(65) Prior Publication Data

US 2002/0098874 A1 Jul. 25, 2002

(51) Int. Cl.⁷ ................................................. H04Q 7/20
(52) U.S. Cl. ..................... 455/463; 455/461; 455/418; 455/565; 455/90.1; 379/201.01
(58) Field of Search .............................. 455/463, 461, 455/418, 564, 459, 458, 550.1, 551, 435.1, 403, 575.1, 565, 413, 521, 420, 419, 566, 90.1, 567, 563, 460, 442, 575, 550, 404; 379/201.01, 201.12, 355.06, 142.01, 197, 88.19, 359, 195, 200, 369, 60, 199, 58, 59; 395/132; 340/826; 342/457, 465, 442, 446

(56) References Cited

U.S. PATENT DOCUMENTS

| 3,843,841 | A | 10/1974 | Rubinstein | 179/5 P |
|---|---|---|---|---|
| 3,969,709 | A | 7/1976 | Isaacs et al. | 340/224 |
| 4,237,344 | A | 12/1980 | Moore | 179/2 A |
| 4,284,849 | A | 8/1981 | Anderson et al. | 179/5 R |
| 4,303,801 | A | 12/1981 | Anderson et al. | 179/5 R |
| 4,531,527 | A | 7/1985 | Reinhold, Jr. et al. | 128/696 |

(Continued)

OTHER PUBLICATIONS

Menard, Raymond J., et al., "Assisted Personal Communication System and Method", U.S. Appl. No. 10/719,672, filed Nov. 21, 2003, 25 pgs.

Menard, Raymond J., et al., "Bi–directional Wireless Detection System", U.S. Appl. No. 10/757,367, filed Jan. 14, 2004, 35 pgs.

Menard, Raymond J., et al., "Bi–Directional Wireless Detection System", U.S. Appl. No. 09/372,249, filed Aug. 11, 1999, 36 pgs.

(Continued)

*Primary Examiner*—Edward F. Urban
*Assistant Examiner*—Charles Chow
(74) *Attorney, Agent, or Firm*—Schwegman, Lundberg, Woessner & Kluth, P.A.

(57) ABSTRACT

A cellular telephone having restricted dialing authority and a simplified keypad. The keypad includes a plurality of preprogrammed hot keys. Incoming telephone calls from authorized telephone numbers are answerable and incoming telephone calls from other numbers do not ring. The authorized telephone numbers are programmable. In one embodiment, predetermined encoded messages can be transmitted silently.

18 Claims, 4 Drawing Sheets

U.S. PATENT DOCUMENTS

| | | | |
|---|---|---|---|
| 4,772,876 A | 9/1988 | Laud | 340/539 |
| 4,789,859 A | 12/1988 | Clarkson et al. | 340/825.31 |
| 4,843,377 A | 6/1989 | Fuller et al. | 340/573 |
| 4,856,047 A | 8/1989 | Saunders | 379/57 |
| 4,908,600 A | 3/1990 | Martinez | 340/310 R |
| 4,993,059 A | 2/1991 | Smith et al. | 379/39 |
| 4,994,787 A | 2/1991 | Kratt et al. | 340/505 |
| 5,016,172 A | 5/1991 | Dessertine | 364/413.02 |
| 5,025,374 A | 6/1991 | Roizen et al. | 364/413.02 |
| 5,062,147 A | 10/1991 | Pickett et al. | 364/900 |
| 5,081,667 A | 1/1992 | Drori et al. | 379/59 |
| 5,128,979 A | 7/1992 | Reich et al. | 379/40 |
| 5,179,571 A | 1/1993 | Schilling | 375/1 |
| 5,195,126 A | 3/1993 | Carrier et al. | 379/45 |
| 5,223,844 A | 6/1993 | Mansell et al. | 342/357 |
| 5,228,449 A | 7/1993 | Christ et al. | 128/691 |
| 5,276,728 A | 1/1994 | Pagliaroli et al. | 379/58 |
| 5,278,539 A | 1/1994 | Lauterbach et al. | 340/539 |
| 5,319,355 A | 6/1994 | Russek | 340/573 |
| 5,319,698 A | 6/1994 | Glidewell et al. | 379/39 |
| 5,333,173 A | 7/1994 | Seazholtz et al. | 379/45 |
| 5,351,235 A | 9/1994 | Lahtinen | 370/58.1 |
| 5,390,238 A | 2/1995 | Kirk et al. | 379/93 |
| 5,398,782 A | 3/1995 | Talbot et al. | 187/393 |
| 5,400,246 A | 3/1995 | Wilson et al. | 364/146 |
| 5,402,466 A | 3/1995 | Delahanty | 379/44 |
| 5,404,577 A | 4/1995 | Zuckerman et al. | 455/66 |
| 5,410,292 A | 4/1995 | Le Van Suu | 340/310.06 |
| 5,412,372 A | 5/1995 | Parkhurst et al. | 340/568 |
| 5,416,695 A | 5/1995 | Stutman et al. | 364/413.02 |
| 5,432,841 A | 7/1995 | Rimer | 379/59 |
| 5,451,839 A | 9/1995 | Rappaport et al. | 375/224 |
| 5,485,504 A | 1/1996 | Ohnsorge | 379/58 |
| 5,486,812 A | 1/1996 | Todd | 340/539 |
| 5,487,108 A * | 1/1996 | Atkins et al. | 379/355.06 |
| 5,507,162 A | 4/1996 | Chhatwal | 70/278 |
| 5,513,111 A | 4/1996 | Wortham | 364/460 |
| 5,552,641 A | 9/1996 | Fischer et al. | 307/10.5 |
| 5,568,535 A | 10/1996 | Sheffer et al. | 379/39 |
| 5,570,083 A | 10/1996 | Johnson | 340/692 |
| 5,583,517 A * | 12/1996 | Yokev et al. | 342/457 |
| 5,583,831 A | 12/1996 | Churchill et al. | 368/10 |
| 5,587,701 A | 12/1996 | Hess | 340/541 |
| 5,630,207 A | 5/1997 | Gitlin et al. | 455/54.1 |
| 5,640,147 A | 6/1997 | Chek et al. | 340/573 |
| 5,652,564 A | 7/1997 | Winbush | 340/426 |
| 5,687,215 A | 11/1997 | Timm et al. | 379/58 |
| 5,712,619 A | 1/1998 | Simkin | 340/539 |
| 5,719,551 A | 2/1998 | Flick | 340/426 |
| 5,736,932 A | 4/1998 | Bulfer et al. | 340/825.34 |
| 5,739,748 A | 4/1998 | Flick | 340/426 |
| 5,742,233 A | 4/1998 | Hoffman et al. | 340/573 |
| 5,752,976 A | 5/1998 | Duffin et al. | 607/32 |
| 5,754,111 A | 5/1998 | Garcia | 340/573 |
| 5,777,551 A | 7/1998 | Hess | 340/541 |
| 5,778,315 A * | 7/1998 | Proietti | 455/419 |
| 5,784,685 A | 7/1998 | Stanford et al. | 455/31.2 |
| 5,786,746 A | 7/1998 | Lombardo et al. | 340/286.07 |
| 5,793,283 A | 8/1998 | Davis | 340/426 |
| 5,812,536 A | 9/1998 | Manduely | 370/282 |
| 5,815,417 A | 9/1998 | Orr et al. | 364/578 |
| 5,821,854 A | 10/1998 | Dorinski et al. | 340/539 |
| 5,825,283 A | 10/1998 | Camhi | 340/438 |
| 5,845,203 A | 12/1998 | LaDue | 455/414 |
| 5,850,180 A | 12/1998 | Hess | 340/541 |
| 5,850,344 A | 12/1998 | Conkright | 364/479.01 |
| 5,852,408 A | 12/1998 | Christiansen et al. | 340/870.09 |
| H1782 H | 2/1999 | Wicks et al. | 340/825.44 |
| 5,870,020 A | 2/1999 | Harrison, Jr. | 340/426 |
| 5,873,043 A | 2/1999 | Comer | 455/458 |
| 5,874,889 A | 2/1999 | Higdon et al. | 340/426 |
| 5,892,442 A | 4/1999 | Ozery | 340/539 |
| 5,894,591 A | 4/1999 | Tamayo | 455/31.2 |
| 5,898,391 A | 4/1999 | Jefferies et al. | 340/988 |
| 5,898,904 A | 4/1999 | Wang | 455/31.3 |
| 5,902,234 A | 5/1999 | Webb | 600/300 |
| 5,907,279 A | 5/1999 | Bruins et al. | 340/506 |
| 5,917,405 A | 6/1999 | Joao | 340/426 |
| 5,933,080 A | 8/1999 | Nojima | 340/539 |
| 5,940,007 A | 8/1999 | Brinkmeyer et al. | 340/825.69 |
| 5,959,529 A | 9/1999 | Kail, IV | 340/539 |
| 5,983,347 A | 11/1999 | Brinkmeyer et al. | 713/200 |
| 6,023,223 A | 2/2000 | Baxter, Jr. | 340/531 |
| 6,023,241 A | 2/2000 | Clapper | 342/357.13 |
| 6,023,620 A * | 2/2000 | Hansson | 455/419 |
| 6,028,514 A | 2/2000 | Lemelson, et al. | 340/539 |
| 6,035,021 A | 3/2000 | Katz | 379/93.12 |
| 6,035,217 A | 3/2000 | Kravitz | 455/561 |
| 6,038,896 A | 3/2000 | Chamberlain et al. | 70/279.1 |
| 6,044,257 A | 3/2000 | Boling et al. | 455/404 |
| 6,057,758 A | 5/2000 | Dempsey et al. | 340/539 |
| 6,072,402 A | 6/2000 | Kniffin et al. | 340/825.31 |
| 6,084,510 A | 7/2000 | Lemelson et al. | 340/539 |
| 6,085,079 A * | 7/2000 | Tabeta | 455/403 |
| 6,087,952 A | 7/2000 | Prabhakaran | 340/693.5 |
| 6,089,058 A | 7/2000 | Elpern et al. | 70/279.1 |
| 6,118,866 A | 9/2000 | Shtivelman | 379/309 |
| 6,147,622 A | 11/2000 | Fonea | 340/825.31 |
| 6,148,213 A * | 11/2000 | Bertocci et al. | 455/462 |
| 6,160,877 A * | 12/2000 | Tatchell et al. | 379/197 |
| 6,192,248 B1 * | 2/2001 | Solondz | 455/450 |
| 6,288,641 B1 | 9/2001 | Casais | 340/539 |
| 6,295,346 B1 | 9/2001 | Markowitz et al. | 379/127.01 |
| 6,340,928 B1 | 1/2002 | McCurdy | 340/436 |
| 6,356,192 B1 | 3/2002 | Menard et al. | 340/359 |
| 6,388,612 B1 | 5/2002 | Neher | 342/357.07 |
| 6,442,241 B1 | 8/2002 | Tsumpes | 379/45 |
| 6,529,723 B1 | 3/2003 | Bentley | 455/405 |
| 6,542,733 B1 * | 4/2003 | Dennis | 455/433 |
| 6,563,910 B2 | 5/2003 | Menard et al. | 379/45 |
| 6,567,671 B2 * | 5/2003 | Amin | 455/415 |
| 6,591,094 B1 | 7/2003 | Bentley | 455/405 |
| 6,608,557 B1 | 8/2003 | Menard et al. | 340/506 |
| 6,667,688 B1 | 12/2003 | Menard et al. | 340/531 |
| 6,671,351 B2 | 12/2003 | Menard et al. | 379/45 |
| 2002/0009184 A1 * | 1/2002 | Shnier | 379/142.01 |
| 2002/0075940 A1 * | 6/2002 | Haartsen | 375/132 |

OTHER PUBLICATIONS

Menard, Raymond J., et al., "Bi–directional Wireless Detection System", U.S. Appl. No. 09/956,474, filed Sep. 19, 2001, 38 pgs.

Menard, Raymond J., et al., "Detection System using Personal Communication Device with Response", U.S. Appl. No. 10/322,374, filed Dec. 17, 2002, 17 pgs.

Menard, Raymond J., "Emergency Communication and Monitoring System and Method", U.S. Appl. No. 10/165,221, filed Jun. 7, 2002, 29 pgs.

Menard, Raymond J., "Emergency Response Information Distribution", U.S. Appl. No. 10/409,661, filed Apr. 7, 2003, 35 pgs.

Menard, Raymond J., et al., "Interactive Motion Sensitive Sensor", U.S. Appl. No. 10/601,330, filed Jun. 20, 2003, 46 pgs.

Menard, Raymond J., et al., "Long Range, Bidirectional, Wireless Personal Communication System", U.S. Appl. No. 09/277,805, filed Mar. 27, 1999, 25 pgs.

Menard, Raymond J., et al., "Method and System for Wireless Tracking", U.S. Appl. No. 10/112,669, filed Mar. 28, 2002, 79 pgs.

Menard, Raymond J., et al., "Modular Communication System and Method", U.S. Appl. No. 09/579,913, filed May 26, 2000, 68 pgs.

Menard, Raymond J., et al., "Remote Notification of Monitored Condition", U.S. Appl. No. 10/112,690, filed Mar. 28, 2002, 75 pgs.

Menard, Raymond J., et al., "Systems and Methods for Transmitting Signals to a Central Station", U.S. Appl. No. 10/640,876, filed Aug. 13, 2003, 18 pgs.

Puchek, Daniel R., et al., "Monitoring and Communication System for Stationary and Mobile Persons", U.S. Appl. No. 09/315,739, filed May 20, 1999, 38 pgs.

Puchek, Daniel R., et al., "Monitoring and Communication System for Stationary and Mobile Persons", U.S. Appl. No. 10/254,048, filed Sep. 23, 2002, 41 pgs.

Webb, Nicholas, "Medical Communication System for Ambulatory Home–Care Patients", U.S. Appl. No. 08/880,817, filed Jun. 27, 1997, 30 pgs.

*Skyroute Communictions,* http://www.sur–gard.com/skyroute.htm, pp. 1–4, (1974).

"21st Century Emergency Safety Communication Policy", *ComCARE Alliance,* http://www.comcare.org/21ct99.htm, 3 pages, (2000).

"AlarmNet–A Original Alarmnet", *AlarmNet,* http;//www.ademco.com/AlarmNet/AlarmNetA.htm, pp. 1–2, (2000).

"AlarmNet–C Control Channel Cellular", *AlarmNet,* http://www.ademco.com/AlarmNet/AlarmNetC.htm, 2 pages, (2000).

"AlarmNet–M Mobitex System", *AlarmNet,* http://www.ademco.com/AlarmNet/AlarmNetM.htm, p. 1, (2000).

"allNetDevices:—Geoworks, Openware End Patent Fight", *allNetDevices,* http://www.devices.internet.com/icom_cgi/print/print.cgi?url=http://devices.internet.com/industry/ne...., 1 page, (2000).

"allNetDevices:—The Device–Centric Home in 2000: Close, But No Cigar", *allNetDevices,*http://www.devices.internet.com, 3 pages, (2000).

"ARM7 Thumb Family", *Arm Powered,* Product Information, 4 p., (Prior to May 26, 2000).

"ARM9 Thumb Family", *Arm Ltd.,* Product Information, 6 Pages, (Prior to May 26, 2000).

"Automatic Crash Notification", *ComCARE Alliance,* http://www.comcare.org/overview.htm, 2 pages, (2000).

"Blue–Connect", *Acer NeWeb Corporation,* Product Brief, 1 page, (Prior to May 26, 200).

"Blue–Share", *Acer NeWeb Corporation,* Product Brief, 1 page, (Prior to May 26, 2000).

"Bluetooth—solutions for personal area networking", *TDK Systems, Inc.,* Manufactures Brochure, 4 pages, (Prior to May 26, 2000).

"Bluetooth Development using SDL, MSC and TTCN", *Teleogic AB,* Product Information, 13 Pages, (Prior to May 26, 2000).

"Bluetooth Product Design—a natural progressionof our existing buiness", *RTX,* Manufactures Brochure, 4 pages, (Prior to May 26, 200).

"Bluetooth White Paper", *AU–System AB,* Entire Pamphlet, (1999).

"Connect 24 Data Communications", *Connect 24,* http://www.connect24.com, 1 page, (2001).

"CreataLink", *Motorola, Inc.,* 2 pages, (1999).

"CreataLink 2XT", *Motorola,* http://www.motorola.com/MIMS/MSPG/Products/OEM/calxt, 1 page, (Mar. 1999)..

"CreataLink 2XT", *Motorla Messaging Products,* www-.mot.com/MIMS/MSPG/Products/OEM/calxt/, 1 p., (Mar. 1999).

"Designing Solutions for the Internet Economy", *Intel Developer Forum Spring 2000,* Program Brochure, 2 pages, (Feb. 15–17, 2000).

"Digianswer Bluetooth—Development and Demonstration Tools", *DIGIANSWER A/S,* Product Sheet, 6 pages, (Prior to May 26, 2000).

"DIGIANSWER/Bluetooth Technology", *Digainswer (Irl) Ltd.,* Product Information, 8 Pages, (Prior to May 26, 2000).

"Emergency 911 Cellular Phone and Cellular Phone Accessories", *AAA Communications,* http://web.idirect.com/aaa/, 1–7 pages, (2001).

"Emergency Terms", *Glossary,* http://www.comcare.org/glossary.htm, 3 pages, (2000).

"Empowering the mobile enterprise", *Puma Technology, Inc.,* Manufactures Brochure, 2 pages, (1996–1999).

"Emulation System Speeds Development of CDMA Satcom Handsets", *Penton Publishing, inc.,* Product Information, 4 Pages, (1997).

"Enabling Innovation", *Arm Ltd.,* Product Brochure, 10 Pages, (1999).

"Get a better vantage point and outmaneuver the competition", *Cadence Design Systems, Inc.,* Manufactures Brochures, 2 pages, (1999).

"Introduction to the HomeRF Technical Specification", *HomeRF,* pp. 1–17, (2000).

"IVT—Bluetooth Protocol Stack SDL/C Source Code", *Bluthtooth,* Product Brochure, 2 pages, (Prior to May 26, 2000).

"Lucent Technologies and Bluetooth", *Lucent Technologies, Inc.,* Manufactures Brochure, 2 pages, (Dec. 1999).

"ObjectGEODE—The Most Advanced Integrated Environment for the Development of Distributed Real–time Systems", *VERILOG S.A.,* Entire Brochure, (1998).

"ORA Electronics Introduces Rescue Mate, a Complete Cellular Telephone Safety Package; Hands–Free Operation, Instant Emergency 911 Access, Roadside Assistance Services", *Business Wire,* http://www.findarticles.com, 2 pages, (1998).

"OSE—the new generation realtime operating system", *ENA OSE Systems,* Informational Brochure, Entire booklet, (1999).

"PSAP Updates and Third–Party Call Centers", *ComCARE Alliance,* http://www.comcare.org/psap.htm, 2 pages, (2000).

"Samsung Electronics joins home radio frequency group in developement of wireless network for the home", *Samsung Electronics,* http://www.samsung.com/news/samsung/1998/sea0305.html, pp. 1–2, (1998).

"Socket's Bluetooth Cordless Communications Card FAQ", *Socket Communications, Inc.,* Information Literature, 2 pages, (Dec. 1999).

"Spontaneous Connections", *CommVerge,* 6 pages, (May 2000).

"Tachless Remote Engine Starters", *Almex,* http://www.almexltd.com/iei/mantis1200.htm, pp. 1–3, (2000).

"Technology Solutions for Bluetooth from Ericsson Microelectronics", *Erricson Components AB,* Manufactures Brochure, 2 pages, (Nov. 1999).

"The Ericsson Bluetooth Development Kit—Faster launching of Bluetooth Products", *Ericsson Mobile Communications, AB,* Manufactures Brochure, 2 pages, (1999).

"The Secret of Sucess!", *SIGnal Newsletter—The Official Newsletter of the Bluetooth Special Interest Group,* Issue No. 3, 8 Pages, (Nov. 1999).

"UMTS W–DCMA Technology Development Using the Aptix System Explorer MP4 for Algorithm Verification", *Aptix Corporation,* Product Information, 4 Pages, (1999).

"Unleash the World—Core technology for Bluetooth applications", *Ericsson Mobile Communications AB,* Manufactures Brochure, 7 pages, (1999).

"Will the push—not pull—of Internet information dramatically alter out Web interactions", *Sunworld,* http://www.sunworld.com, 6 pages, (2000).

"Wireless Connections Made Easy", *Bluetooth,* Manufactures Brochure, 19 Pages, (Prior to May 26, 2000).

"Your Vision—Our Solution", *RTX Telcom,* Manufactures Brochure, 6 pages, (Prior to May 26, 2000).

Houston, J., "Socket Teams with Cambridge Silicon Radio for Bluetooth Cordless Networking on Windows CE", *Socket Communications, Inc.,* Press Release, 2 pages, (1999).

Nobel, C., "Microsoft jumps on the Bluetooth bandwagon", *PC Week,* 1 page, (Dec. 6, 1999).

Posti, J., "Motorola Introduces CreataLink 2 XT ReFLEX Two–way Data Transceiver for Wireless Communications", *Motorola Press Release,* www.mot.com/MIMS/MSPG/Press/PRI9990303_21575.html, 2 p., (Mar. 1999).

\* cited by examiner

CELLULAR TELEPHONE WITH PROGRAMMABLE AUTHORIZED TELEPHONE NUMBER

TECHNICAL FIELD

The present invention relates generally to the field of cellular telephones and, in particular, to a system and method for a cellular telephone having restricted incoming and outgoing telephone call capabilities.

BACKGROUND

Cellular telephones have become very popular tools for mobile communications. Most telephones include a digital keypad that allows a user to enter a telephone number to be called. Many telephone models also include programmable keys that allow a user to select and dial a telephone number from a set of previously stored telephone numbers.

Cellular telephones are relatively expensive to purchase and operate. Cellular telephone service providers, or commercial wireless carriers, often charge a usage fee as well as a monthly service fee. The usage fee may vary depending on the time of day or day of the week of the call. Many users are surprised to find that they have used their cellular telephone much more than anticipated and they make the realization only after receiving their telephone bill. In particular, children using cellular telephones often fail to understand the costs of using a telephone.

Nevertheless, cellular telephones have proven valuable in emergency situations. Emergency medical, fire, and police are routinely summoned by callers using a cellular telephone. The portability of the cellular telephone, along with the broad network of cellular tower sites, has meant that emergency services can be called from virtually anywhere.

In the hands of a child, however, an ordinary cellular telephone may be useless. Some children are unable to manipulate the keypad and buttons to place, or receive, a telephone call. Some children lack the maturity to recognize a genuine emergency situation, and thus, may needlessly dial 911 when parental input would be adequate. In other situations, the child may fail to place an emergency call when needed, and thus, place themselves, others, and property in jeopardy. Thus, some parents are reluctant to give a cellular telephone to a child, despite the potential benefits.

Parents may feel that the child will waste air time in idle talk with friends or strangers. Parents may also feel that interruptions from a telephone can be an unwelcome distraction in the academic lives of their children. Parents may feel that a cellular telephone is a dangerous distraction for inexperienced and young automobile drivers.

Thus parents that provide an ordinary cellular telephone to a child are likely to be frustrated by the problem of improper use by the child.

Vulnerable adults are also often incapable of exercising appropriate judgement with a cellular telephone. As with children, the vulnerable adult may indiscriminately use the telephone or may fail to use the telephone in the face of a genuine need.

What is needed in the art is a cellular telephone which allows a supervisory authority to specify authorized use and yet improve safety for children and vulnerable people.

SUMMARY

The above mentioned problems with cellular telephone systems are addressed by the present invention and will be understood by reading and studying the following specification. A system and method is described which provides a cellular telephone having restricted incoming and outgoing telephone call capabilities.

In one embodiment, the apparatus includes a cellular telephone transceiver and a processor. A memory coupled to the processor stores a plurality of predetermined telephone numbers. The predetermined telephone numbers are outgoing telephone numbers. The apparatus includes a keypad having user operable buttons and is devoid of individual number digits. A program executable on the processor causes the transceiver to dial a particular outgoing telephone number, selected by a user, upon hitting a button on the keypad.

The apparatus may have another memory for storing an encoded message and a program executable on the processor causes the transceiver to transmit the encoded message upon hitting the button. The transceiver may transmit the encoded message using a short message service (SMS). The apparatus may have a location module for determining a geographical location and the encoded message may include information regarding the geographical location. The apparatus may have a spread spectrum frequency hopping transceiver for wirelessly communicating digital data. The digital data may include a program for execution on the processor. The spread spectrum frequency hopping transceiver may operate at a frequency of approximately 2.45 GHz and be substantially compatible with standards under IEEE 802.15. A transceiver compatible with BLUETOOTH® technical specification version 1.0 may be included. The apparatus may include a display for displaying the predetermined telephone number or name. The apparatus may include an interface for communicating the predetermined telephone number. The interface may include an electrical connector or a wireless coupling, such as infrared coupling or a radio frequency coupling. The apparatus may have a memory for storing an authorized telephone number, a talk button, and a program to generate a signal upon detecting an incoming call from the authorized telephone number and for answering the call upon hitting the talk button and for rejecting an incoming telephone call from a number different from the authorized telephone number. The apparatus may have a sound generator to signal an incoming call.

One embodiment includes a method including providing an Internet website with user selectable options for operating a cellular telephone. User selected options are received and are encoded into a digital data stream. The method includes determining the geographical location of the cellular telephone and forwarding the digital data stream to a transmitter located within range of the cellular telephone. The transmitter communicates using a protocol compatible with the cellular telephone. The digital data stream is wirelessly transmitted to the telephone.

Embodiments include transmitting a signal to the cellular telephone to indicate an incoming call and to indicate termination of the incoming call. Wirelessly transmitting may include transmitting using a control channel or a voice channel. One method includes authenticating the identity of the subscriber. Options on the website include receiving an authorized incoming telephone number and receiving an outgoing telephone number and button assignment for the outgoing telephone number. One option allows receiving a request to install a program for operating the cellular telephone. One embodiment includes determining a time of nonuse for the cellular telephone. Methods include transmitting a signal to the cellular telephone to indicate completion of the transmission of the digital data stream and displaying an order confirmation upon receiving a user selected option.

One method concerning the present subject matter includes offering to provide commercial wireless carrier services to a cellular telephone subscriber at a first usage rate for a first telephone having unrestricted incoming and outgoing call capability, and offering to provide commercial wireless carrier services to the cellular telephone subscriber at a second usage rate for a second telephone having restricted incoming and outgoing call capability. In addition, the method includes offering to provide commercial wireless carrier services to the cellular telephone subscriber at a third usage rate for the second telephone for a telephone call between the first telephone and the second telephone where the subscriber accepts the offer to provide services at the first usage rate for the first telephone.

In one embodiment, the third usage rate is below that of the second usage rate. Methods include allowing the cellular telephone subscriber to select an option for wirelessly establishing a configuration for the first telephone or for the second telephone.

In one embodiment, an apparatus includes a cellular telephone transceiver, a processor, a first memory for storing predetermined telephone numbers, a second memory for storing an authorized telephone number, a keypad devoid of individual number digits, a talk button, a display for displaying a text string for a particular telephone number and a program executable on the processor. The program is for causing the processor to scroll the telephone numbers in the display using the selection button, and for dialing a number in the display and for generating a signal upon detecting an authorized incoming telephone call and for rendering a call unanswerable when the number is not authorized.

Other methods and systems are possible, as will be more fully described below.

DETAILED DESCRIPTION

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
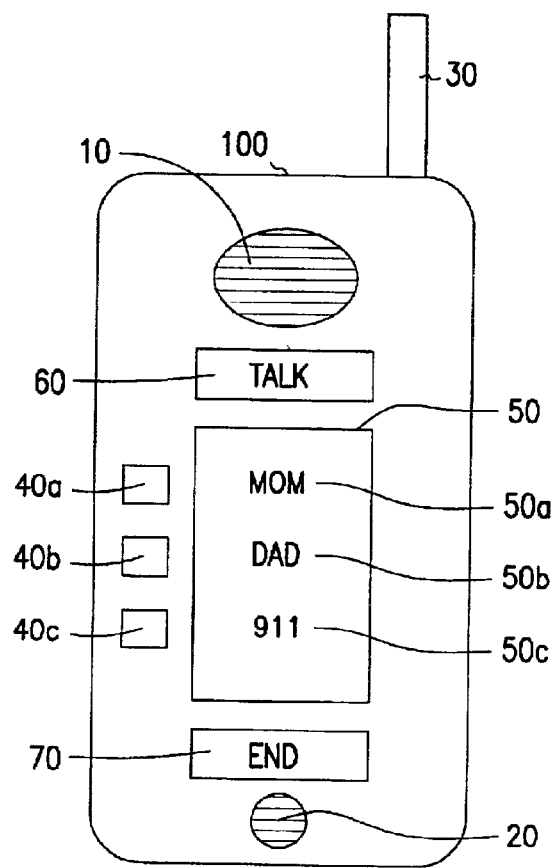
FIG. 1 illustrates a view of the front of an apparatus in accordance with one embodiment of the present system.

FIG. 1 illustrates an embodiment of telephone 100 according to the present system. Telephone 100 includes speaker 10, microphone 20 and antenna 30. Speaker 10 produces audible sounds based on radio frequency signals received by antenna 30 and processed by telephone 100. Microphone 20 receives local audio in the vicinity of telephone 100 and produces an electrical signal. The electrical signal from microphone 20 is processed by telephone 100 and transmitted as radio frequency signals using antenna 30. In one embodiment, telephone 100 includes a cellular telephone transceiver.

In the embodiment shown, telephone 100 includes operable buttons 40a, 40b and 40c. Positioned near button 40a is label 50a, herein marked "Mom." Furthermore, positioned near button 40b is label 50b, herein marked "Dad" and positioned near button 40c is label 50c, herein marked "911." In the figure, labels 50a, 50b and 50c appear on rectangular surface 50. In one embodiment, rectangular surface 50 is an adhesive label affixed to the housing of telephone 100. In one embodiment, rectangular surface 50 is a graphical display and labels 50a, 50b and 50c are electronically generated text strings. It will be appreciated that other labels, having different lengths and text strings, may be used. For example, in one embodiment, the label includes a telephone number. As further examples, the labels may include a graphical image, character or icon. In one embodiment, no label is provided and each button is of a different color, shape or surface texture than the other. More or less than three buttons may also used.

In one embodiment, telephone 100 also includes talk button 60 and end button 70. In the embodiment shown, buttons 60 and 70, like buttons 40a, 40b and 40c, are user operable electrical switches. In one embodiment, buttons 40a, 40b, 40c, 60 and 70 are soft keys on a touch sensitive display screen. In one embodiment, buttons 40a, 40b, 40c, 60 and 70 are protected by a membrane. The membrane may be impervious to moisture and thus prevent water damage to the keys.

A telephone number is associated with each of buttons 40a, 40b and 40c. In one embodiment, each of the three telephone numbers is unique, although the present subject matter is not so limited. Continuing with the embodiment in the figure, button 40a is associated with a telephone number for reaching a person known as "mom." In the figure, button 40b is associated with a telephone number for reaching a person known as "dad" and button 40c is associated with a telephone number for reaching an emergency response facility having telephone number 911.

Each of the telephone numbers may be a two, three or four digit extension number, a seven or ten digit local telephone number, an eleven digit long distance number or any other length telephone number. Each telephone number may include programed pauses or other special characters. The length of each telephone number is limited only by the memory capacity of telephone 100. Each telephone number may be a cellular telephone number, a pager telephone number or other number.

The front panel shown in FIG. 1 may include a removable, or hinged, cover to protect telephone 100 from damage. The cover may be of metal, plastic, or other material. Telephone 100 may be subjected to harsh environmental factors and a protective cover may reduce damage or the occurrence of inadvertent dialing. Telephone 100 may be adapted to be received by a protective holster, also of plastic, metal, textile, or other material. In one embodiment, telephone 100 is adapted for a high moisture environment or for immersion in water or fluids to a predetermined depth. Telephone 100 may be waterproof or water resistant.

Consider next an exemplary use for telephone 100. In the hands of a child, telephone 100 provides a simple mechanism for contacting an authority. For example, a child may be instructed to select and operate button 40a if interested in talking with "mom," button 40b if interested in talking with "dad," and button 40c if the situation appears to be of an emergency nature. The child is further instructed that in the case of uncertainty, select button 40c.

Operating a button refers to pushing the button to make electrical contact, or touching a touch sensitive screen in the vicinity of the image of the button. When the button is operated telephone 100 accesses the previously stored telephone number associated with the particular button and a telephone call is placed to the number.

In one embodiment, placing a telephone call to a telephone number entails seizing a telephone line and generating a series of dual tone multi-frequency (DTMF) tones. The DTMF tones correspond to the selected telephone number stored in the memory.

With the telephone of FIG. 1, placing a telephone call entails operating the desired button. Upon operating the button, telephone 100 executes a procedure in an attempt to establish a telephone line connection to the desired telephone number.

The procedure for placing the call may vary, but in one embodiment, it includes wirelessly transmitting a digital packet to telephone 100 from another device or from telephone 100 to another device. The digital packet may include digital data or digital voice.

The telephone numbers that are associated with buttons 40a, 40b and 40c are to be protected from intentional or unintentional alteration by the user. In one embodiment, the numbers are stored in a memory that is inaccessible without the proper programming or equipment.

The telephone numbers that are associated with buttons 40a, 40b and 40c are placed into memory by an authorized user. Any of several means may be used to enter the telephone numbers into memory. For example, in one embodiment, telephone 100 is coupled by a connector to a computer, personal data assistant, or other digital device executing suitable programming to generate a list of telephone numbers. The digital device allows entry of the desired telephone numbers which can then be downloaded to telephone 100. The connector may include a cradle, docking station, or other housing to securely hold telephone 100. In one embodiment, the telephone numbers can be placed into memory using an infrared link. For example, a portion of the housing of telephone 100 may include an element sensitive to infrared (IR) encoded signals and a suitable IR driving source may transmit the telephone numbers to telephone 100. In one embodiment, telephone 100 accepts removable storage media, such as, for example, COMPACTFLASH™ (Sandisk Corporation) or SMARTMEDIA™ (Kabushiki Kaisha Toshiba DBA Toshiba Corporation) or other such small form factor media. In one embodiment, the housing of telephone 100 includes a repositionable panel that affords access to a hidden keypad. Using the keypad, an authorized user can manipulate the keys to enter a desired telephone number. In such an embodiment, the repositionable panel is securely held in the closed position and may require a screwdriver, key or other tool to operate. In one embodiment, telephone 100 includes a touch sensitive display (touch screen) which depict softkeys emulating an alphanumeric keypad. An authorized user can access the softkeys and thus enter desired telephone numbers. Access to the touch screen is restricted by a password or other security measures. Other methods of entering telephone numbers are also contemplated and the foregoing is intended as exemplary only, and not by way limitation.

Talk button 60 allows a caller to receive an incoming telephone call. Telephone 100 is assigned a unique telephone number which can be dialed by any other telephone. Telephone 100, however, is programmed to receive telephone calls from authorized telephone numbers only. Incoming calls originated from telephone numbers not authorized cannot be answered by telephone 100. In one embodiment, calls from an unauthorized telephone number do not generate a ring on telephone 100. In one embodiment, calls from an unauthorized telephone are met with a brief off hook signal and then quickly followed with an on hook signal. The off hook signal is tantamount to lifting the handset on a wired telephone and the on hook signal is tantamount to replacing the handset in the cradle. In other words, from the perspective of the caller, the phone appears to have been picked up and immediately hung up. In one embodiment, rather than return the phone to the on hook position, telephone 100 remains off hook for a predetermined period of time. The off hook period of time is selected to discourage the caller from repeatedly attempting to call and yet not render the telephone unavailable for other uses for an excessive period of time. Other methods of rendering a call unanswerable are also contemplated. For example, the wireless carrier communication network may include programming to suppress incoming calls from, or outgoing calls to, a particular telephone number.

End button 70 terminates a telephone call. The telephone call may have been originated by telephone 100 or received by telephone 100. After terminating a call using button 70, telephone 100 is again ready to originate a new call or receive a new call from an authorized telephone number.

In one embodiment, a power button is also provided to allow turning telephone 100 on or off. Other method may be used to turn the power on or off. For example, pressing a button for a predetermined period of time will turn on telephone 100, and holding the same, or a different, button down for a predetermined period will power telephone 100 off. As another example, holding a pair of buttons down will turn telephone 100 on or off. The foregoing methods are exemplary only and not to be taken as limitations.

In one embodiment, a volume control button is provided to adjust the amplitude of sound from speaker 60. A particular button or rotating knob or wheel may be provided to adjust the volume.

Figure 2:
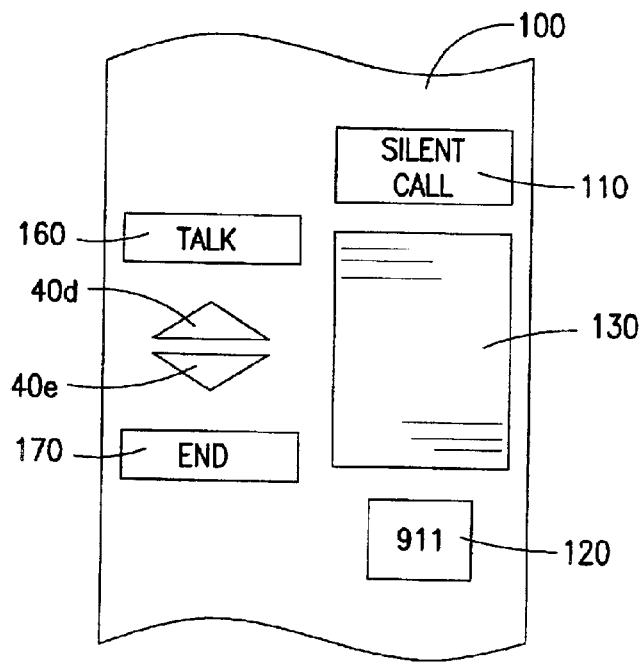
FIG. 2 illustrates a portion of the front of an apparatus in accordance with one embodiment of the present system.

FIG. 2 illustrates a portion of another embodiment of telephone 100 having controls and a display. Among the controls are silent call button 110, talk button 160, scroll up button 40d, scroll down button 40e, end button 170, and 911 button 120. Display 130 is illustrated as having a rectangular screen. Display 130 may include an LED display, an LCD display or any other display able to depict alphanumeric characters, graphical images or icons.

In the embodiment of FIG. 2, silent call button 110 is user accessible, and like the buttons previously described, it includes a switch, membrane protected button, or other operable button. Silent call button 110 allows a user to transmit an encoded message to a predetermined destination or telephone number. The message is sent without generating audio tones at telephone 100.

The ability to send a silent message may be important in some situations. For example, a child may choose to send a silent message where otherwise they may not be able to conduct a telephone conversation. Safety reasons may prevent a child from using an ordinary telephone in the case of a kidnaping or carjacking. In other cases, a child or user may choose to send a previously stored text message without engaging in a conversation. Examples of silent messages may include "pick me up at 5:00," "yes" and "no." Other messages, and messages of different length, are also contemplated.

Messages are stored in a memory of telephone 100. An authority may provide one message, or multiple messages, for use by a particular user. In the case of multiple messages, the user may select a message using one of several message buttons, with each message button associated with a particular message, or using a scrolling function and a selection mechanism. In one embodiment, the user operates silent call button 110 and display 130 depicts a list of available messages. The user can scroll through the list of available messages using a scrolling button. A pair of scrolling buttons, 40d and 40e, are illustrated in FIG. 2 which may prove advantageous where there are many messages to choose from. When the desired message appears in designated portion of the display, the user can select and transmit the message by operating silent call button 110. In the case of a single available message, operating silent call button 110 causes telephone 100 to transmit the message. Telephone 100 may have memory capacity to store more messages than are available for selection by a user. A programming function, selectable using softkeys or other controls, allows an authority to specify those stored messages that are available for selection by a particular user.

Messages can be stored in telephone 100 by various means. For example, in one embodiment, a message can be stored using a connector coupled to a computer, personal data assistant, or other digital device executing suitable programming to generate a message. The digital device allows entry of the message which can then be downloaded to telephone 100. The connector may include a cradle, docking station, or other housing to securely hold telephone 100. In one embodiment, the message can be placed into memory using an infrared link. For example, a portion of the housing of telephone 100 may include an element sensitive to infrared (IR) encoded signals and a suitable IR driving source may transmit a message to telephone 100. In one embodiment, telephone 100 accepts removable storage media, such as, for example, COMPACTFLASH™ (Sandisk Corporation) or SMARTMEDIA™ (Kabushiki Kaisha Toshiba DBA Toshiba Corporation) or other such small form factor media. In one embodiment, the housing of telephone 100 includes a repositionable panel that affords access to a hidden keypad. Using the keypad, an authorized user can manipulate the keys to enter a desired message. In such an embodiment, the repositionable panel is securely held in the closed position and may require a screwdriver, key or other tool to operate. In one embodiment, telephone 100 includes a touch sensitive display (touch screen) which depict softkeys emulating a keypad. An authorized user can access the softkeys and thus enter desired messages. Access to the touch screen is restricted by a password or other security measures. Other methods of entering messages are also contemplated and the foregoing is intended as exemplary only, and not by way limitation.

Telephone 100 may transmit the message using a variety of protocols. One example, short message service (SMS) refers to the transfer of text messages having up to 160 alphanumeric characters to and from a cellular telephone. Another example, CELLEMETRY™ (CELLEMETRY LLC), permits short messages to be sent using the control channel of a cellular telephone. Various paging protocols, or other text transmission means are also contemplated.

A voice or data message may include location information. For example, it may be important for a user to transmit a silent message including their present location. Technology that provide location information includes Global Positioning System (GPS), and various triangulation technologies based on timing or angle of signal transmission and reception and Cell Of Origin (COO) information.

Talk button 160 functions in the manner described above with regard to receiving and answering an incoming telephone call. Additionally, talk button 160 is used in the embodiment of FIG. 2 relative to scrolling button 40d and scrolling button 40e. In particular, when the user has identified a desired authorized outgoing telephone number using buttons 40d and 40e, then pushing talk button 160 causes telephone 160 to place the outgoing call. A user may identify the desired outgoing telephone number by recognizing the telephone number when it appears in display 130 or by recognizing a name, word, graphical image or icon when it appears. Telephone 100 is allowed to place calls only to authorized telephone numbers stored in internal memory.

Button 120 is labeled "911" and when pushed, automatically attempts to place a call to the 911 emergency service.

Figure 3:
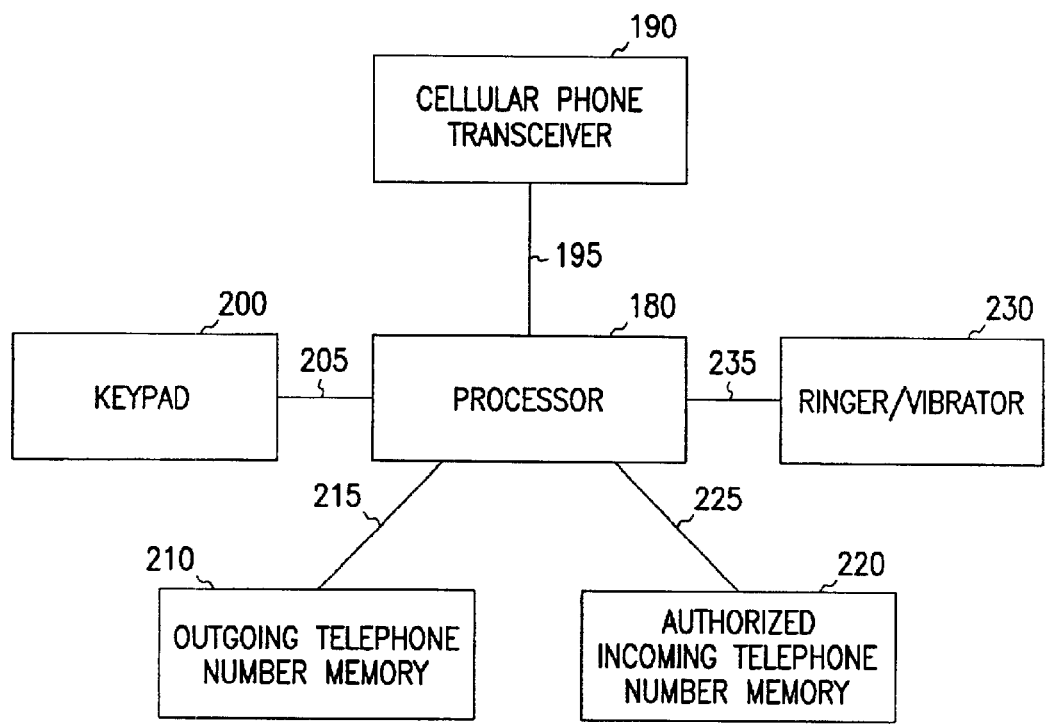
FIG. 3 illustrates a block diagram of selected components in one embodiment of the present system.

FIG. 3 illustrates a block diagram of selected elements of telephone 100. Transceiver 190 includes the radio frequency transmitter and receiver to perform cellular communications. Transceiver 190, which may include a digital or analog transceiver, is coupled to processor 180 by line 195. Link 195 may represent digital data lines, analog signal lines, an address bus, power lines, and other signal lines.

In one embodiment, processor 180 is a digital microprocessor having programming and memory. Processor 180, in conjunction with suitable programming, manages and controls the operation of transceiver 190. In addition, processor 180 in conjunction with transceiver 190, in one embodiment, also implements the telephone call answering functions and the telephone call receiving functions enumerated herein.

Keypad 200 is coupled to processor 180 by link 205. Keypad 200 may include a hidden, or restricted access keypad. Keypad 200 may include a display having a touch sensitive surface and programming to implement a softkey function. Keypad 200 may include talk button 60 or 160, end button 70 or 170, and buttons 40a, 40b and 40c, and scroll buttons 40d and 40e, emergency 911 button 120 and silent call button 110.

Memory 210 is coupled to processor 180 by link 215 and, in one embodiment, provides storage for an outgoing telephone number. The outgoing telephone number is one for which the user, and thus telephone 100, is authorized to call. In one embodiment, telephone 100 includes storage for a plurality of authorized outgoing telephone numbers. An authority may mark a subset of the authorized outgoing telephone numbers as available and thus, provide access to some numbers and preclude access to others. Memory 210 may include random access memory (RAM), read only memory (ROM) or removable storage media. The removable media may include magnetic or optical media. In one embodiment, a removable storage media device can be coupled to telephone 100. In such case, the coupling between memory 210 and telephone 100 may be protected to prevent unauthorized removal or replacement of the media. For example, the coupling may be secured with structural elements that discourage tampering, such as those requiring a key, a tool, or other device to operate. Link 215 may represent digital data lines, analog signal lines, an address bus, power lines, and other signal lines.

Memory 220 is coupled to processor 180 by link 225 and, in one embodiment, provides storage for an authorized incoming telephone number. The authorized incoming telephone number is one for which the user, and thus telephone 100, is authorized to receive a call from. In one embodiment, telephone 100 includes storage for a plurality of authorized incoming telephone numbers. An authority may mark a subset of the authorized incoming telephone numbers as available and thus, provide access to some numbers and preclude access to others. Memory 220 may include random access memory (RAM), read only memory (ROM) or removable storage media. The removable media may include magnetic or optical media. In one embodiment, a removable storage media device can be coupled to telephone 100. In such case, the coupling between memory 220 and telephone 100 may be protected to prevent unauthorized removal or replacement of the media. For example, the coupling may be secured with structural elements that discourage tampering, such as those requiring a key, a tool, or other device to operate. Link 225 may represent digital data lines, analog signal lines, an address bus, power lines, and other signal lines.

Ringer/Vibrator 230 is coupled to processor 180 by link 235 and, in one embodiment, provides an audible or tactile signal to a user. The signal may indicate arrival of an incoming telephone call or it may indicate completion of a downloading or uploading operation. Ringer/Vibrator 230 may include a tone generator, piezoelectric device or an electro mechanical device to generate either a sound or a vibration. Link 235 may represent digital data lines, analog signal lines, an address bus, power lines, and other signal lines.

FIGS. 4A, 4B, 4C and 4D illustrate portions of the embodiment described relative to FIG. 3. It will be appreciated that processor 180, in one embodiment, may be coupled to one or more of the devices or modules illustrated in FIGS. 4A, 4B, 4C and 4D.

Figure 4A:
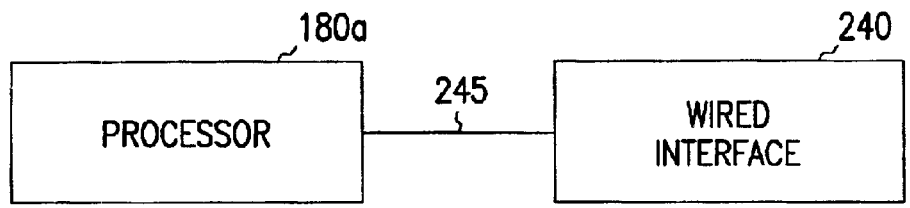
FIGS. 4A, 4B, 4C AND 4D illustrate portions of the block diagram of FIG. 3.

In FIG. 4A, processor 180a is shown coupled to wired interface 240 by link 245. Wired interface 240 may include an electrical connector to receive data from sources external to telephone 100. Interface 240 may include a USB connector, a proprietary connector, or other miniature connector. The connector may be integral with a cradle, holster or docking station. Processor 180a, in conjunction with the connector, implements a security protocol to assure that only authorized users are able to access processor 180a using wired interface 240. Link 245 may represent digital data lines, analog signal lines, an address bus, power lines, and other signal lines.

Wired interface 240 allows transfer of data between processor 180a and an external device. The data may be sent from an external device for purposes of placing telephone numbers and name information into memory of telephone 100. The data may also include graphical images or text messages in alphanumeric characters. In addition, wired interface 240 permits upgrading and replacement of programming executing on processor 180a. The programming may relate to improved functionality or correction of defects. Wired interface 240 also permits coupling of diagnostic equipment or test equipment to telephone 100.

Figure 4B:
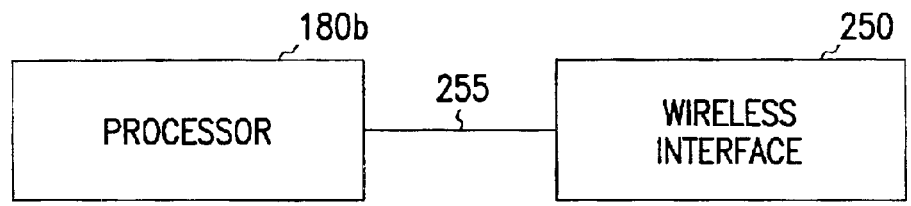

In FIG. 4B, processor 180b is shown coupled to wireless interface 250 by link 255. Wireless interface 250 may include a wireless transceiver to receive data from sources external to telephone 100. Interface 250 may include a radio frequency link, optical link, magnetic link or other means for transferring data or programs. Examples of radio frequency links include Home RF™, BLUETOOTH® or other radio frequency communication links. An optical link may include an infrared (IR) coupling or other optical communication link. Wireless interface 250 may have an effective communication range of several millimeters to several hundred feet. Processor 180b, in conjunction with wireless interface 250, implements a security protocol to assure that only authorized users are able to access processor 180b using wireless interface 250. Link 255 may represent digital data lines, analog signal lines, an address bus, power lines, and other signal lines.

Wireless interface 250 allows transfer of data between processor 180b and a suitable external device. The data may be sent from an external device for purposes of placing telephone numbers and name information into memory of telephone 100. The data may also include graphical images or text messages in alphanumeric characters. In addition, wireless interface 250 permits upgrading and replacement of programming executing on processor 180b. The programming may relate to improved functionality or correction of defects. Wireless interface 250 also permits coupling of diagnostic equipment or test equipment to telephone 100.

Figure 4C:
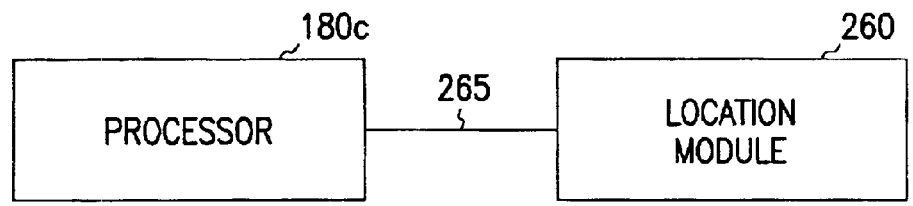

In FIG. 4C, processor 180c is shown coupled to location module 260 by link 265. Location module 260 may include a GPS receiver, a LORAN receiver. Location 260 may include programming, executing on processor 180c (or other processor) to perform triangulation calculations to determine location information based on a wireless signal. For example, signal strength information, and timing information, derived from transceiver 190, or other transceiver, may provide data to calculate and determine a geographical position of telephone 100. Link 265 may represent digital data lines, analog signal lines, an address bus, power lines, and other signal lines. Link 265 communicates the positional information generated by module 260 to processor 180c. Positional information may be included in silent wireless messages transmitted by telephone 100. In one embodiment, location information is determined by programming executing at a remote processor and the results of which are then transmitted to telephone 100.

Telephone 100, when enabled with a transceiver compatible with Home RF™ or BLUETOOTH® technology, is able to communicate wirelessly with other similarly equipped devices. For example, a telephone 100 with a BLUETOOTH® technology transceiver can be configured to operate with a BLUETOOTH® technology headset for hands free communication.

Figure 4D:
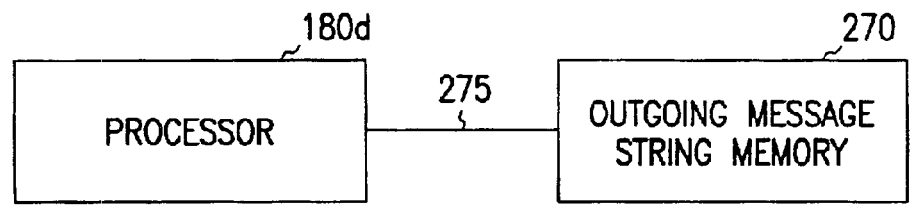

In FIG. 4D, processor 180d is shown coupled to memory 270 by link 275. Memory 270 provides storage for an outgoing message string. Memory 270 may provide storage for more than one message string. In one embodiment, a user can select from among available memory strings using a selection button or by scrolling through a list displayed on screen 130. In one embodiment, the outgoing message string includes data derived from location module 260.

Figure 5:
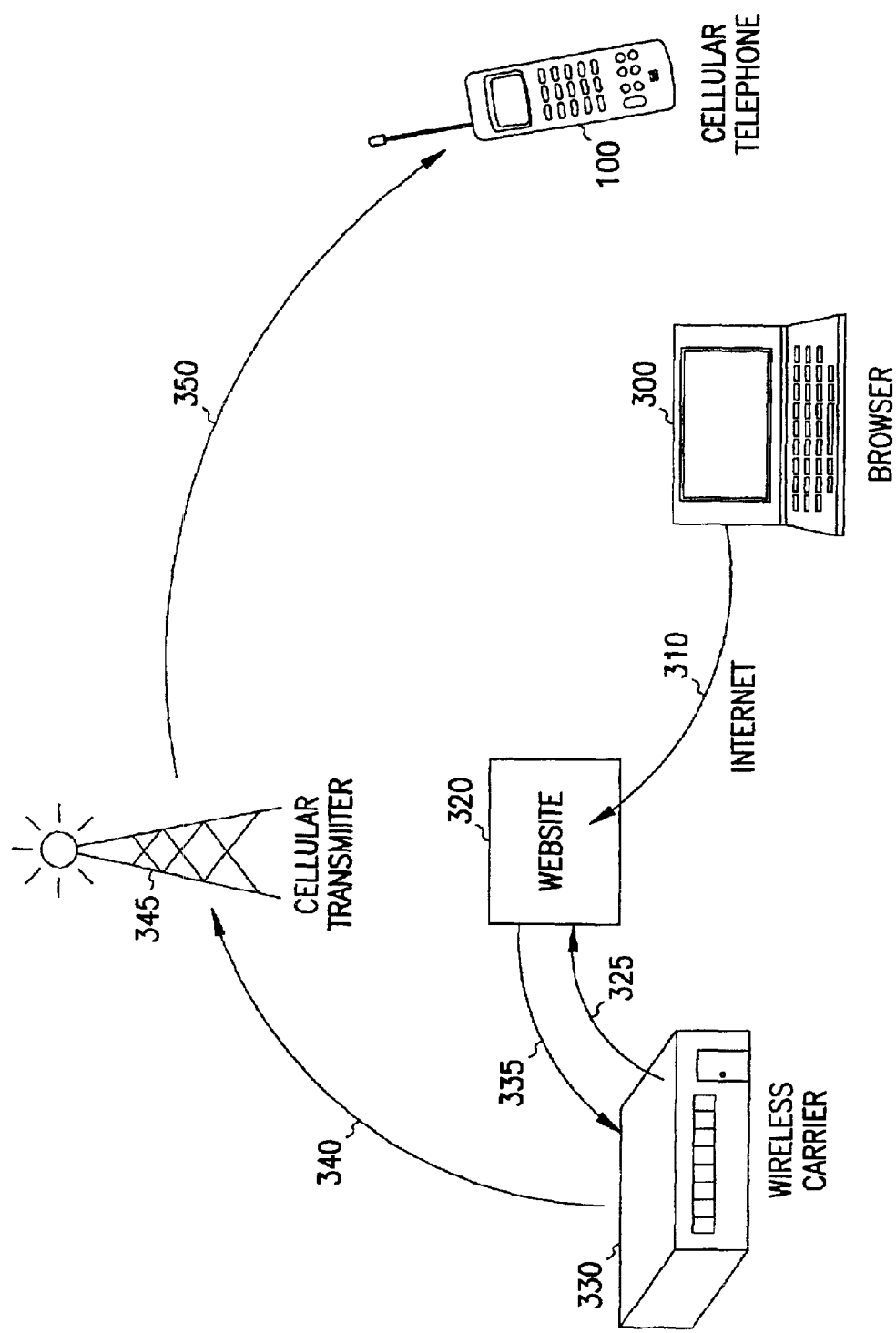
FIG. 5 illustrates a method of configuring and programming an apparatus according to one embodiment of the present system.

FIG. 5 illustrates an example of transmitting data or programming to telephone 100. It will be appreciated that other types of cellular telephones, pagers, or wireless devices may receive data and program information using the method illustrated in the figure.

FIG. 5 shows personal computer 300 operating a browser and accessing the Internet using link 310. The link to the Internet may include a dial-up connection, a cable modem connection, a digital subscriber line (DSL), a wireless connection, a T-1 connection or a network connection. Using the browser, an authorized use may access website 320 provided by commercial wireless services carrier 330. Carrier 330 provides programming, data services, and communication services for cellular telephone 100. At website 320, an authorized user may make program selections, establish an operational configuration, upload (or download) telephone numbers, text strings, graphical images, icons, or select software upgrades for telephone 100. Selections and data made by the authorized user are communicated from the website to carrier 330 on the link herein illustrated as 335. Carrier 330 encodes the data received on link 330 into a packetized digital data stream and forwards the data stream to cellular transmitter 345.

Transmitter 345 is in communication with telephone 100. If telephone 100 is within transmission range of transmitter 345, then, using link 350, data can be sent to telephone 100. The digital data may be sent using a control channel or using a voice channel. The transmission of data may proceed silently and unbeknownst to a user carrying telephone 100. The data may be transmitted during periods of non-use. Telephone 100 may provide an indication of successful download of data from transmitter 345. The data may install automatically or on command by a user. The data may include telephone numbers, names, software upgrades or other digital data. The data may include error correction and handshaking signals.

In addition, program data available on computer 300 may also be transmitted to telephone 100 by using website 320, carrier 330 and transmitter 345. For example, data in an e-mail program, such as Microsoft Outlook, may be transferred to telephone 100. Telephone 100 may receive data on command from computer 300, anytime data in computer 300 changes, according to a predetermined schedule, or on request by telephone 100. Telephone 100 may send a request for data to transmitter 345. In this manner, telephone 100 may be configured to remain updated with information from computer 300.

Telephone 100 provides enhanced functionality that is not otherwise available from a typical cellular telephone. Furthermore, it may be that households with a traditional cellular telephone may be interested in providing telephone 100 for use by minor residents of the household. An incentive program to enhance brand loyalty may be implemented to increase market penetration using telephone 100.

For example, a commercial wireless services carrier may offer to provide services to a potential cellular telephone subscriber, customer, at a first rate keyed to usage of a particular telephone. The telephone may be a standard telephone having unrestricted ability to place and receive telephone calls. The carrier may also offer to provide services to the potential customer at a second rate, also keyed to usage of telephone 100. Telephone 100 has restricted ability to place calls and receive calls. In addition, the carrier may offer to provide services to the potential customer at a third rate for calls between the standard telephone (also on the same telephone service plan) and telephone 100. In other words, a child carrying telephone 100 may call a parent or guardian at a discounted rate, and the parent or guardian may call telephone 100 at a discounted rate. Additional telephones in the same telephone service plan may further reduce the usage rate. The lower rate may be enjoyed for air time using the standard telephone or telephone 100.

Additional Embodiments

Other embodiments of the present subject matter are also contemplated. For example, an authorized user may prepare a first removable storage media having a first set of telephone numbers and a second removable storage media having a second set of telephone numbers. As another example, an authorized user may prepare telephone 100 with more than one stored operating configuration. In particular, an authority may specify one of several different configurations for a particular telephone 100 depending upon the time of day, day of the week, or who is to be carrying the telephone. The configurations may differ in the authorized incoming telephone numbers, the outgoing telephone numbers, or the silent messages available for transmission. As a further example, it will be appreciated that memory 270, memory 210, and memory 220 may be a single memory device or multiple memory devices. As yet another example, telephone 100 may be used to send or receive pre-recorded voice messages, synthesized voice messages, or text messages. Telephone 100 may also be configured for programming using a wireless application protocol (WAP) interface. In addition, telephone 100 may be configured to send a WAP message.

Other embodiments are also contemplated. In addition to transmitting SMS signals, transceiver 190 may also transmit digital or text messages using a variety of protocols and systems. For example, simple mail transfer protocol (SMTP) or other protocols may be used.

In one embodiment, an authorized user may query telephone 100 and request that telephone 100 report it's current location. The request may be transmitted using a website or by using a WAP enabled telephone coupled to a computer at the wireless service carrier. For example, a parent may use a telephone to send a message to a carrier and request a reply including the location of telephone 100. Also, a person with a telephone in communication with the carrier may also send a text message, or other string, to telephone 100 for display on display 130.

In one embodiment, the carrier network includes programming to suppress an unauthorized telephone call. Incoming calls not authorized are not allowed to ring through to telephone 100 and outgoing calls are blocked by the network. A combination of blocking by telephone 100 and blocking by the carrier network is also contemplated.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention.

What is claimed is:

1. An apparatus comprising;
    a cellular telephone transceiver;
    a processor coupled to the transceiver;
    a first memory coupled to the processor and adapted for storage of a plurality of predetermined telephone numbers;
    a keypad having a plurality of user operable buttons coupled to the processor;
    a program accessible to the processor and having instructions adapted for causing the transceiver to dial a particular predetermined telephone number selected from the plurality of predetermined telephone numbers upon operation of a button selected from the plurality of buttons;
    a second memory coupled to the processor and adapted for storage of information identifying one or more authorized telephone callers;
    a talk button coupled to the processor; and
    a program accessible to the processor and having instructions adapted for causing the processor to generate a signal upon the transceiver detecting an incoming telephone call from at least one of the one or more authorized telephone callers and adapted for not generating the signal upon detection of an incoming telephone call from a caller that is not at least one of the one or more authorized telephone callers, wherein the first memory is programmable by an authorized user to enter the plurality of predetermined telephone numbers and to control calls made by the apparatus.

2. The apparatus of claim 1 further comprising:

a second memory coupled to the processor and adapted for storage of an encoded message; and a program accessible to the processor and having instructions adapted for causing the transceiver to transmit the encoded message upon operation of the button.

3. The apparatus of claim 2 wherein the transceiver is adapted for transmitting the encoded message using a short message service.

4. The apparatus of claim 3 further comprising a location module coupled to the processor and adapted for determining a geographical location of the module.

5. The apparatus of claim 4 further wherein the encoded message includes the geographical location.

6. The apparatus of claim 1 further comprising a spread spectrum frequency hopping transceiver coupled to the processor and adapted for wirelessly communicating digital data.

7. The apparatus of claim 6 wherein the digital data includes a program adapted for execution on the processor.

8. The apparatus of claim 6 wherein the spread spectrum frequency hopping transceiver operates at a frequency of approximately 2.45 GHZ.

9. The apparatus of claim 6 wherein the spread spectrum frequency hopping transceiver is substantially compatible with standards under IEEE 802.15.

10. The apparatus of claim 6 wherein the spread spectrum frequency hopping transceiver is substantially compatible with BLUETOOTH® technical specification version 1.0.

11. The apparatus of claim 1 further comprising a display coupled to the processor and adapted for displaying the predetermined telephone number.

12. The apparatus of claim 1 further comprising an interface coupled to the processor and adapted for communicating the predetermined telephone number.

13. The apparatus of claim 12 wherein the interface includes an electrical connector.

14. The apparatus of claim 12 wherein the interface includes a wireless coupling.

15. The apparatus of claim 14 wherein the wireless coupling includes an infrared coupling.

16. The apparatus of claim 15 wherein the wireless coupling includes a radio frequency coupling.

17. The apparatus of claim 1 further comprising a sound generator coupled to the processor and adapted for generating a sound based on the signal.

18. An apparatus comprising:

a cellular telephone transceiver;

a processor coupled to the transceiver;

a first memory coupled to the processor and adapted for storage of a plurality of predetermined telephone numbers;

a second memory coupled to the processor and adapted for storage of an authorized telephone number;

a keypad having a user operable selection button coupled to the processor and wherein the keypad is devoid of individual number digits;

a user operable talk button coupled to the processor;

a display coupled to the processor and adapted for displaying a text string corresponding to a particular telephone number selected from the plurality of predetermined telephone numbers; and a program accessible to the processor and having instructions adapted for causing the processor to scroll the plurality of telephone numbers in the display upon operation of the selection button, and adapted for causing the transceiver to dial a particular predetermined telephone number appearing in the display upon operation of the talk button, and adapted for causing the processor to generate a signal upon detecting a telephone call from the authorized telephone number and causing the telephone call to be answered upon operating the talk button, and adapted for causing the processor to render the telephone call unanswerable upon detecting the incoming telephone call from a number disparate from the authorized telephone number.

* * * * *

UNITED STATES PATENT AND TRADEMARK OFFICE
CERTIFICATE OF CORRECTION

PATENT NO. : 6,912,399 B2
DATED : June 28, 2005
INVENTOR(S) : Zirul et al.

It is certified that error appears in the above-identified patent and that said Letters Patent is hereby corrected as shown below:

Column 12,
Line 44, after "comprising" delete ";" and insert -- : --, therefor.

Signed and Sealed this

Fifteenth Day of November, 2005

JON W. DUDAS
*Director of the United States Patent and Trademark Office*

(12) EX PARTE REEXAMINATION CERTIFICATE (7608th)
United States Patent
Zirul et al.

(10) Number: US 6,912,399 C1
(45) Certificate Issued: Jul. 13, 2010

(54) CELLULAR TELEPHONE WITH PROGRAMMABLE AUTHORIZED TELEPHONE NUMBER

(75) Inventors: Jocelyn Zirul, Brooklyn Center, MN (US); Raymond J. Menard, Hastings, MN (US)

(73) Assignee: Royal Thoughts, LLC, Burnsville, MN (US)

Reexamination Request:
No. 90/010,776, Dec. 16, 2009

Reexamination Certificate for:
Patent No.: 6,912,399
Issued: Jun. 28, 2005
Appl. No.: 09/767,663
Filed: Jan. 22, 2001

Certificate of Correction issued Nov. 15, 2005.

(51) Int. Cl.
| | |
|---|---|
| H04M 1/66 | (2006.01) |
| H04M 1/677 | (2006.01) |
| H04M 1/663 | (2006.01) |
| H04M 1/725 | (2006.01) |
| H04M 1/72 | (2006.01) |

(52) U.S. Cl. .................. 455/463; 379/201.01; 455/418; 455/461

(58) Field of Classification Search ................... None
See application file for complete search history.

(56) References Cited
U.S. PATENT DOCUMENTS 6,085,080 A   7/2000   Rahikainen et al. ......... 455/403

*Primary Examiner*—Ovidio Escalante

(57) ABSTRACT

A cellular telephone having restricted dialing authority and a simplified keypad. The keypad includes a plurality of pre-programmed hot keys. Incoming telephone calls from authorized telephone numbers are answerable and incoming telephone calls from other numbers do not ring. The authorized telephone numbers are programmable. In one embodiment, predetermined encoded messages can be transmitted silently.

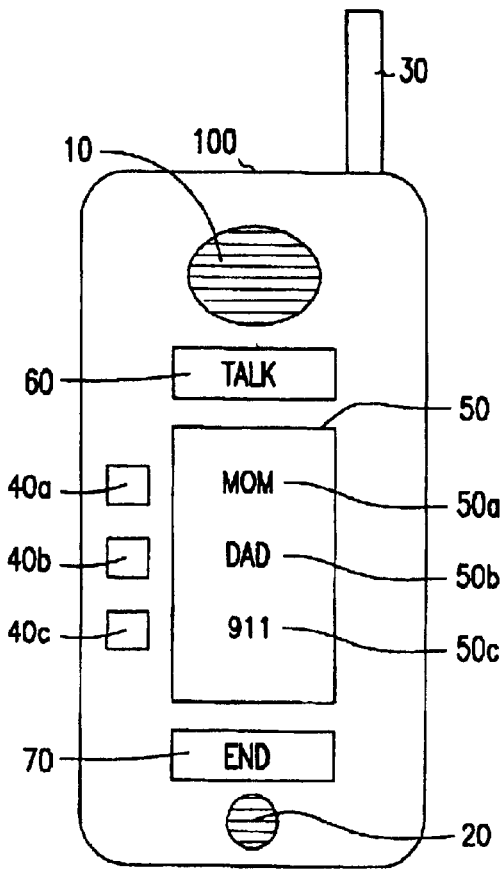

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 18 is confirmed.

Claims 2-17 were not reexamined.

* * * * *